United States Patent [19]

Garrett et al.

[11] 4,351,419

[45] Sep. 28, 1982

[54] AUTOMATIC SLACK ADJUSTER

[75] Inventors: Wayne Garrett, Troy; Richard F. Neuman, Farmington, both of Mich.

[73] Assignee: Eaton Corporation, Cleveland, Ohio

[21] Appl. No.: 147,643

[22] Filed: May 7, 1980

[51] Int. Cl.³ .............................................. F16D 65/56
[52] U.S. Cl. .............................. 188/71.9; 188/196 D; 192/111 A
[58] Field of Search ................. 188/71.8, 71.9, 196 D, 188/79.5 K; 192/81 C, 111 A; 64/15 C, 27 C, 30 E

[56] References Cited

U.S. PATENT DOCUMENTS

| | | |
|---|---|---|
| 2,203,890 | 6/1940 | Browall et al. ............... 188/196 D |
| 2,939,329 | 6/1960 | Doerries ......................... 192/81 C |
| 3,901,357 | 8/1975 | Reitz et al. .................... 188/79.5 K |
| 3,921,765 | 11/1975 | Swander ........................ 188/79.5 K |
| 3,966,028 | 6/1976 | Anderson et al. ................. 188/71.9 |
| 3,997,035 | 12/1976 | Zeidler ........................... 188/79.5 K |
| 4,064,973 | 12/1977 | Deem et al. ....................... 188/71.9 |

FOREIGN PATENT DOCUMENTS

| | | |
|---|---|---|
| 1067245 | 6/1954 | France ............................ 192/81 C |
| 1180137 | 2/1970 | United Kingdom ............... 188/71.9 |

Primary Examiner—Edward R. Kazenske
Attorney, Agent, or Firm—C. H. Grace; F. M. Sajovec

[57] ABSTRACT

A single-acting, clearance sensing slack adjuster for brakes is provided. The slack adjuster includes a displaceable brake actuation assembly (28), a rotatable driving member (52), a rotatable intermediate member (60) and a rotatable driven member (56). The driven member is in driving relationship with a rotatable adjustment member (50) which is rotatable in a given direction to advance a brake friction member (32) to maintain the running clearance (38) within predetermined limits. A linear to rotational motion assembly (76-80) is provided to rotate the driving member in the slack decreasing direction of rotation in response to greater than predetermined movement (82) of the brake actuation assembly. A first coil clutch (20) couples the driving and intermediate members while a second coil clutch (72) couples the intermediate and driven members. One clutch (72) delivers torque in the given direction in its low torque transmitting capacity direction of rotation and that torque capacity is less than is required to rotate the rotatable actuation members when the brake friction members are engaged.

31 Claims, 6 Drawing Figures

AUTOMATIC SLACK ADJUSTER

BACKGROUND OF THE INVENTION

1. Field of the Invention

The present invention relates to automatic slack adjusters of the force or clearance sensing type and more particularly to a force sensing, automatic, single acting (i.e. operates automatically in the slack take-up direction only) slack adjuster of the type utilizing a torque limited coil slip clutch to limit adjustment torque applied to a rotatable adjustment member wherein the torque limited coil slip clutch transmits torque in the low torque transmitting direction of rotation thereof during the adjustment, i.e. clearance take-up, operation.

2. Brief Description of the Prior Art

Automatic slack adjusters for railway brakes and automative brakes of both the disc and drum type are well known. In particular, single acting automatic vehicle slack adjusters of the force sensing type (also called the clearance sensing type) wherein the adjustment mechanism will sense the forces in the brake system and either disengage the adjustment mechanism or slip when forces exceed a predetermined level, usually corresponding to the expected forces in the system when the drums or discs are contacted by the movable friction elements, to prevent over adjustment are well known and may be appreciated in greater detail by reference to U.S. Pat. No. RE. 26,965 and U.S. Pat. No. 3,507,369, both of which are hereby incorporated by reference. Clearance sensing slack adjusters wherein a torque limited friction clutch of the coil slip clutch type is utilized to limit torque applied to an adjustment member are also known as may be seen by reference to U.S. Pat. Nos. 3,507,369 and 3,901,357, hereby incorporated by reference.

While the automatic clearance sensing slack adjusters of the prior art have been generally well received, certain of the prior art devices were not totally satisfactory as the torque limited coil slip clutches were utilized in the high torque transfer direction of rotation to rotate the adjustment member in the slack take-up direction and were thus subject to being extremely sensitive to variations in friction and lubrication making manufacture and maintenance of such automatic slack adjusters more difficult and/or expensive.

SUMMARY OF THE INVENTION

In accordance with the present invention, the drawbacks of the prior art have been overcome or minimized to the extent that an automatic clearance sensing slack adjuster of the type utilizing a torque limited coil slip clutch to limit torque applied to an adjustment member in the slack take-up direction of rotation is provided which is essentially insensitive to large variations in the coefficient of friction between the coil clutch and the driven and driving members coupled by coil clutch. The above is accomplished by utilizing the coil clutch in the low torque transfer direction of rotation to rotate the adjustment member in the slack take-up direction of rotation.

In the preferred embodiments, an intermediate member is interposed the driving and driven members (usually sleeves or shafts) of the adjustment mechanism. A first coil clutch couples the driving member to the intermediate member and a second coil clutch couples the intermediate member to the driven member. The adjustment mechanism will function equally effectively if the first and second coil clutches are interchanged. In the slack take-up direction of rotation, the first coil clutch is wound to operate in the high torque transfer direction of rotation and will transfer essentially all torque supplied by the driving member to the intermediate member. In the other direction of rotation (slack increase direction of rotation) the first coil clutch will transfer less torque to the intermediate member than the frictional resistance to rotation of the intermediate member to prevent back-off of the slack adjuster. In the slack take-up direction of rotation, the second clutch is wound to operate in the low torque transfer direction of rotation and will slip at a predetermined value over a wide range of frictions to limit torque applied to the adjustment member (i.e. from the intermediate member to the driven member).

It is understood that the driving, intermediate and driven members may be rotatable shafts, sleeves or the like. It is also understood that the term brake as used herein is intended to include frictional torque couplings such as automotive brakes and friction clutches.

Accordingly, it is an object of the present invention to provide a new and improved automatic slack adjuster of the clearance sensing type.

Another object of the present invention is to provide an improved clearance sensing slack adjuster of the type utilizing a torque limit coil clutch to rotate an adjustment member wherein the torque transfer capacity of the coil clutch is substantially constant over a wide range of friction conditions between the members coupled by the coil clutch.

These and other objects and advantages of the present invention will become apparent from a reading of the detailed description of the invention taken in connection with the drawings.

DESCRIPTION OF THE PREFERRED EMBODIMENT

Certain terminology will be used in the following description for convenience in reference only and will not be limiting. The words "upwardly," "downwardly," "rightwardly" and "leftwardly" will designate directions in the drawings to which reference is made. The words "clockwise" and "counterclockwise" will designate direction of rotations as viewed from the right of drawings to which reference is made. The words "inwardly" and "outwardly" will refer to directions toward any away from, respectively, the geometric drive center of the device and designated parts thereof. Said terminology will include the words above specifically mentioned, derivatives thereof and words of similar import.

Figures 1, 1A:
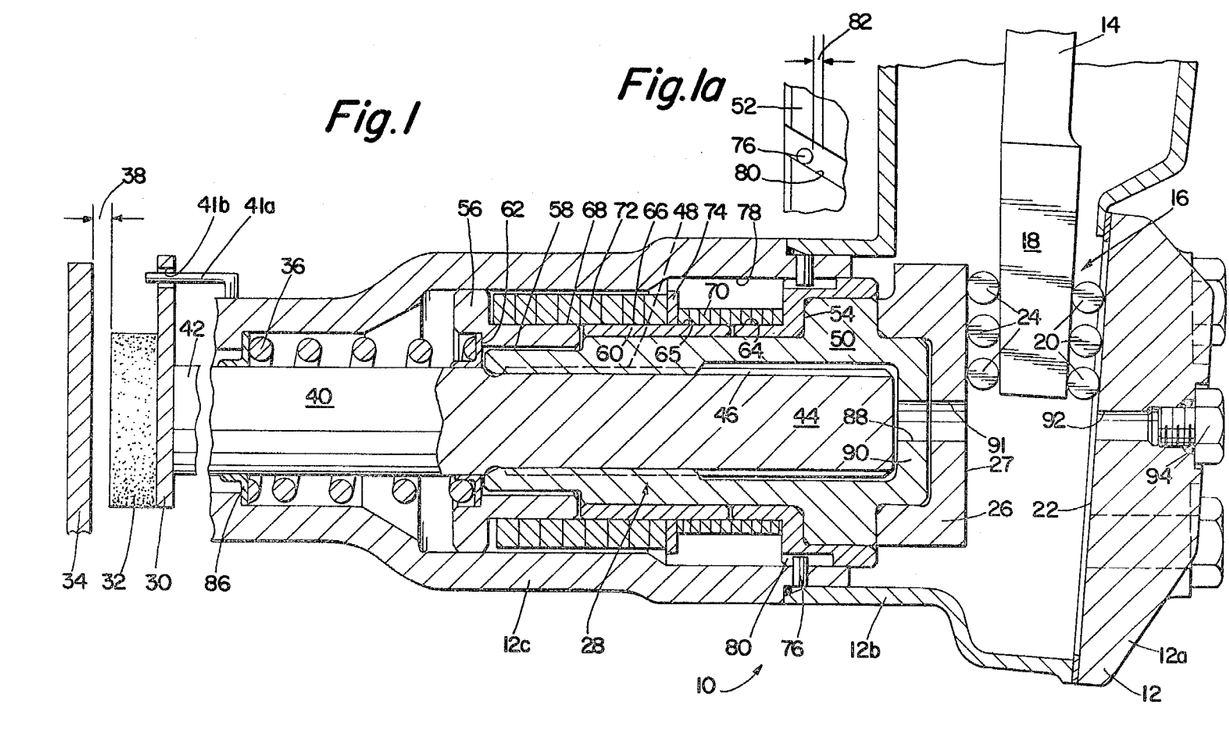
FIG. 1 is a partial sectional view of a wedge or roller cage actuated disc brake utilizing the slack adjuster of the present invention.
FIG. 1A is a partial view of a portion of the slack adjuster of FIG. 1.

One embodiment of the automatic slack adjuster of the present invention is illustrated as utilized with a disc brake wedge-type actuator in FIG. 1. The disc brake actuator-adjuster assembly 10 comprises a housing 12 which is mountable to a caliper (not shown) such as a floating caliper or the like. The specific structure of the housing 12, which may comprise pieces 12a, 12b and 12c and of the caliper forms no part of the present invention. An actuator motor, such as a well known fluid or air motor (not shown) is mountable to housing 12. The actuator is selectively actuatable to force push rod 14 downwardly from the position shown in the drawing and a motor return spring (not shown) will return the push rod to the illustrated position. A roller cage assembly 16 is mounted to the end 18 of the push rod for linear movement therewith. One roller or set of rollers 20 provides a bearing contact between the rod end 18 and inclined surface 22 of housing piece 12a. The other roller, or set of rollers, 24, provides a force transmitting drive connection between the rod end 18 and surface 27 of tappet member 26 of the plunger assembly 28. The specific structural relationships of the push rod end 18, the roller cage 16 and surfaces 27 and 22 may be modified as is well known in the art and forms no part of the present invention. Wedge type actuators are illustrated in U.S. Pat. Nos. 3,547,229, 4,064,973 and 4,085,830 all of which are hereby incorporated by reference.

A brake shoe 30 carrying a friction lining 32 of suitable friction material is mounted to the other (left) end of the plunger assembly 28. A disc 34 is located between shoe 30 and another shoe (not shown) and the shoe 30 will be forced leftwardly by the wedging action of the roller cage assembly 16 on tappet 26 to frictionally contact the disc 34 to retard rotary motion thereof. A return spring 36 is effective to urge plunger assembly 28 to the right to maintain the tappet 26 in contact with the roller cage assembly 16 and to maintain a running clearance, or slack, 38, between the friction material and the disc when the brake is not applied.

As is well known, to maintain the fluid motor stroke within its effective range and to maintain proper actuation times, the running clearance 38 should be maintained within predetermined limits. Thus, as the friction pad 32 wears, the brake shoe 30 should be advanced leftwardly relative to tappet 26 to take-up the slack. Such slack take-up may be accomplished manually or by an automatic slack adjuster which will sense greater than allowed leftward movement of the plunger assembly 28 and adjust the position of the shoe 30 relative to the tappet 26 in response thereto. If a clearance sensing automatic slack adjuster is utilized, the adjuster will sense when the pads engage the disc and cease adjustment at that point to prevent over adjustments in response to mechanical deflections, elasticity and the like.

The plunger assembly 28 comprises an elonged rod 40 which is axially movable but nonrotationally fixed to housing 12. In the embodiment shown, the nonrotational connection comprises a shaft 41a fixed to housing piece 12c which is slidably received in a bore 41b in shoe 30. Other means for such a nonrotational connection are possible and the specific structure utilized forms no part of the present invention. One end 42 of the rod 40 carries the brake shoe 30 while the other end 44 of the rod carries external threads 46 which are threadably engaged with the internal threads 48 carried by nut member 50. In the embodiment shown, threads 46 and 48 are left hand threads. Nut member 50 is axially and rotatably movable in housing 12 and will move axially with tappet 26. Accordingly, nonrotational axial movement of nut member 50 will result in equal axial movement (disregarding mechanical deflections and elasticity) of rod 40 and shoe 30 while rotational movement of nut member 50 relative to rod 40 will result in a variation in the axial distance between shoe 30 and tappet 26. Nut member 50 is thus a rotary adjustment member as rotation of nut member 50 may be utilized to adjust the running clearance or slack 38. It is understood that the nut member could be rotationally fixed in the housing and the rod member rotatable to achieve a slack adjustment and such a modification is contemplated within the scope of the present invention.

The plunger assembly 28 further comprises a driving sleeve 52 rotatably surrounding the nut member 50 and abutting a first shoulder 54 thereon for axial movement therewith, a driven sleeve 56 splined as at 58 to the nut member 50 for rotation therewith and an intermediate sleeve 60 surrounds the nut member 50 for rotation relative thereto. The driven sleeve 56, intermediate sleeve 60 and driving sleeve 52 are all biased towards shoulder 54 by return spring 36 acting on shoulder 62 of the driven sleeve and will all move axially with nut member 50. Of course, nut member 50 and driven sleeve 56 could be rotationally attached by other means or could be formed integrally.

Driving sleeve 52 defines an annular outer surface 64 which is adjacent, coaxial and of substantially the same outer diameter as a first annular outer surface 65 defined by intermediate shaft 60. A first coil clutch 70 having an inner diameter in the relaxed position thereof slightly less than the outer diameters of surfaces 64 and 65 is received in wrapped relationship on surfaces 64 and 65. Intermediate sleeve 60 defines a second annual outer surface 66 which is adjacent, coaxial and of the same outer diameter as an annular surface 68 defined by driven sleeve 56. A second coil clutch 72 having an interior diameter in the relaxed position thereof slightly less than the outer diameter of surfaces 66 and 68 is received in wrapped relationship on surfaces 66 and 68. Preferably, for manufacturing and assembly purposes, surfaces 64, 65, 66 and 68 will be of like outer diameter. A washer or spacer 74 may be interposed coil clutches 70 and 72 to prevent interference therebetween.

It is understood that within the scope of the present invention, one of the adjacent outer surfaces may be of a slightly greater outer diameter, or of a higher coefficient of friction, to assure that the other surface will be the slip surface.

At least one pin member 76 is fixed to housing 12 and extends radially inwardly into housing bore 78. The pins 76 are received in generally helical grooves 80, formed in the outer periphery of driving sleeve 52 with a predetermined amount of clearance or backlash therebetween (shown in a slightly exaggerated form in FIG. 1A). Accordingly, axial movement of plunger assembly 28 to the left by greater than distance 82, the axial component of the clearance between pins 76 and grooves 80, will result in a clockwise, viewed from the right end of FIG. 1, rotation of driving sleeve 52. Distance 82 is selected so that it, in combination with the other backlash in the plunger assembly, will approximately equal the desired predetermined running clearance 38.

First coil clutch 70 provides a rotational driving connection between driving sleeve 52 and intermediate sleeve 60. Coil clutch 70 is wound such that its high torque transmitting capacity is in the clockwise direction of rotation while its low torque transmitting capacity is in the counterclockwise direction of rotation. In a typical adjuster of the type contemplated, coil clutch 70 will transmit all torque developable by driving sleeve 52 to intermediate sleeve 60 in the clockwise direction but only about 20-30 inch-pounds of torque in the counterclockwise direction.

Second coil clutch 72 is wound opposite to coil clutch 70 and operates in its low torque transmitting direction of rotation when transferring clockwise torque from intermediate sleeve 60 to driven sleeve 58. In an adjuster of the type contemplated, coil clutch 72 will have a capacity to deliver about 200 inch-pounds of clockwise torque from intermediate sleeve 60 to driven sleeve 58 in the clockwise direction. It has been found that, in an adjuster of the type contemplated, 200 inch-pounds of torque is sufficient to overcome frictional resistances and to rotate driven sleeve 58 and nut member 50 to advance the position of shoe 30 if the linings 32 have not contacted the disc 34, but insufficient to rotate driven shaft 56 if the linings 32 have contacted the disc. Coil clutch 72 thus acts as a torque limiting coupling for clearance sensing purposes in the low torque transmitting direction of rotation.

Figure 4:
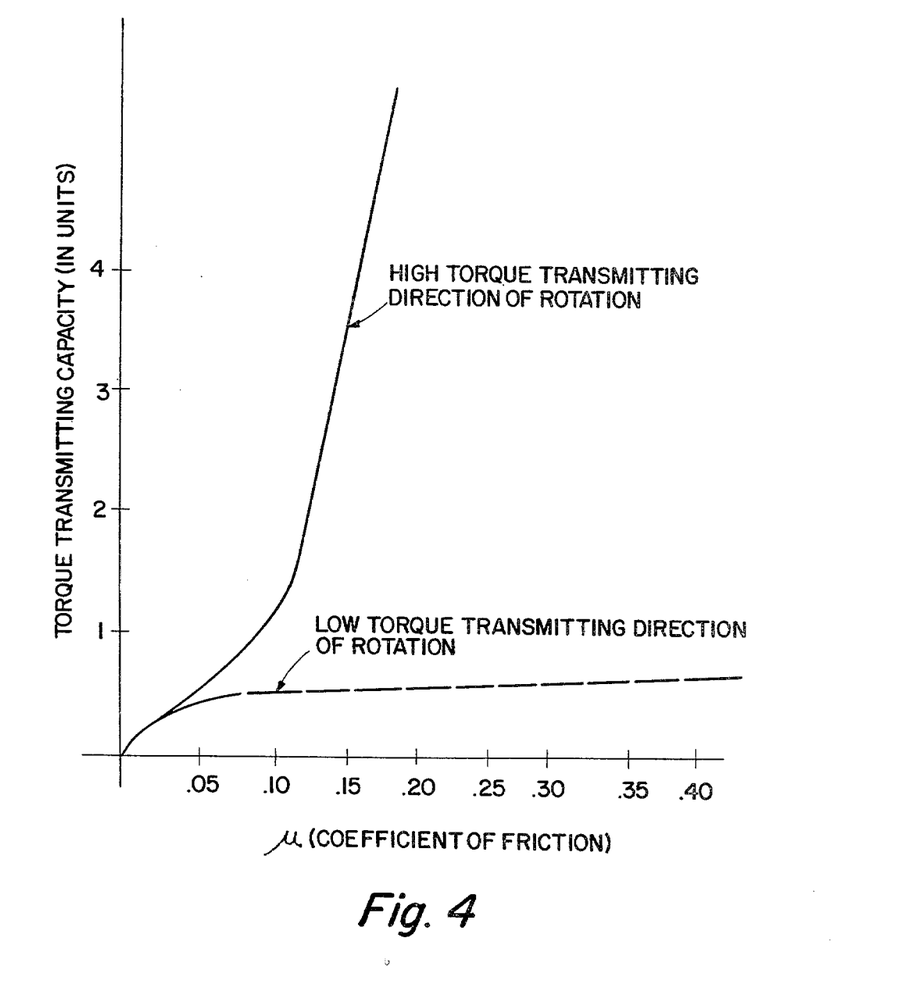
FIG. 4 is a graphical representation of the torque transmitting characteristics of a typical friction coil clutch.

The utilization of coil clutch 72 as a torque limiting coupling operating in its low torque transmitting direction of rotation for advancement of the brake shoe is especially advantageous. The torque transmitting capacity characteristics of a typical coil clutch of the type described are illustrated in graphical form in FIG. 4. As may be seen, in the high torque transmitting direction of rotation, the torque transmitting capacity (i.e. slip torque) is extremely sensitive to the coefficient of friction between the coil clutch and coupled member. Accordingly, if the clutch is to be utilized as a torque limiting member in this direction of rotation, the surface finishes of the clutch and connecting member as well as lubrication thereof must be very carefully controlled. In contrast, in the low torque transmitting direction of rotation, the torque transmitting capacity is quite stable and relatively insensitive to surface conditions and lubrication.

A spring retainer 86 may be utilized to provide a seat for return spring 36 and to provide a bearing surface for axial movement of rod 40 in the housing 12. The return spring 36 acts on driven sleeve 56 and nut member 50 to bias the plunger assembly towards the roller assembly and also provides a resistance to rotation of nut member 50 which exceeds the low torque transmitting capacity of first coil clutch 70 but is less than the high torque transmitting capacity of coil clutch 70 and both the low and high torque transmitting capacities of second coil clutch 72.

The nut member 50 is provided with a configured bore 88 in the right hand wall 90 thereof which is designed to receive a tool head, such as an allen wrench or the like. Bore 88 is aligned with a bore 91 in tappet 26 and a bore 92 in housing piece 12a which is sealed with a removable plug or fastener 94 allowing access to bore 88 from the exterior of disc brake 10 for manual rotation of nut member 50.

In operation, when the brake is to be engaged, the actuator fluid motor forces push rod 14 downwardly and the roller cage assembly 16, acting against inclined surface 22, will force tappet 26 and the remainder of plunger assembly 28 leftwardly to engage the friction pad 30 with the disc. If the leftward axial movment of the plunger assembly is less than the backlash or lost motion 82, drive sleeve 52 will not be rotated.

However, if the running clearance 38 has become excessive and/or the forces of the braking operation create mechanical deflections in the brake assembly, the plunger assembly will move leftwardly by a distance greater than distance 82 and the pin or pins 76 will engage the groove 80 in drive sleeve 52 causing the drive sleeve to be rotated in a clockwise direction. Substantially all of the clockwise torque from drive sleeve 52 will be transmitted to intermediate sleeve 60 by first coil clutch 70 acting in its high torque transmitting direction of rotation. The clockwise torque from intermediate sleeve 60 will be transferred to driven sleeve 56 and nut member 50 splined thereto by second coil clutch 72 acting in its low torque transfer direction of rotation. The maximum clockwise torque transferred to the nut member 50 will thus be limited by the low torque transmitting capacity of coil clutch 72 and will be relatively stable and insensitive to the frictional conditions between coil clutch 72 and the outer surfaces 66 and 68 of sleeves 60 and 56 respectively.

Accordingly, excessive axial movement of the plunger assembly 28 will result in rotation of nut member 50 and advancement of rod 40 and shoe 30 towards the disc to take up excessive slack provided the torque required to rotate nut 50 does not exceed the low torque transmitting capacity of the second coil clutch 72. At such time as the shoe 30 firmly contacts the disc, further leftward movement of the plunger assembly will be the result of mechanical deflections and will not result in over adjustment of the brake as the torque required to rotate nut member 50 will exceed the low torque transmitting capacity of coil clutch 72 and that clutch will slip on surfaces 66 and/or 68.

Upon release of the brake, push rod 14 will be upwardly retracted and the entire plunger assembly 28 will move rightwardly under the bias of return spring 36 to the at rest position shown in FIG. 1. If drive sleeve 52 was rotated clockwise in the application stroke, it will be rotated in the counterclockwise direction during the return stroke. A portion of the counterclockwise torque applied to drive sleeve 52 by pins 76 will be transferred to intermediate sleeve 60 by first coil clutch 70 acting in its low torque transfer direction of rotation. As the torque required to rotate nut member 50 in the counterclockwise direction (as a result of friction in the system) exceeds the low torque transfer capacity of coil clutch 70, the clutch will simply slip on surfaces 64 and/or 65 and undesirable back-off will be prevented.

When it is desired to manually back-off the adjuster (i.e. increase slack) for maintenance or the like, plug 94 is removed and a tool is inserted through bores 92 and 91 into tool head shaped bore 88 and nut member 50 is rotated in the counterclockwise direction. Rotation of nut member 50 in the counterclockwise direction will be resisted by coil clutch 70 acting in the high torque transfer direction of rotation in series with coil clutch 72 acting in the low torque transfer direction of rotation and pins 76 engaging bore 80. Accordingly, to rotate the nut member manually in the counterclockwise direction, a torque exceeding the sum of frictional resistance in the system and the lower of the low torque capacity of coil clutch 72 or the high torque transfer capacity of coil clutch 70 is sufficient. In practice, as the low torque transfer capacity of coil clutch 72 is about 200 inch-pounds and is relative insensitive to frictional conditions, manual back-off does not require excessive effort.

It is recognized that the first coil clutch 70 and second coil clutch 72 could be transposed, that is coil clutch 72 coupling driving sleeve 52 to intermediate sleeve 60 and coil clutch 70 coupling intermediate sleeve 60 to driven sleeve 56, while maintaining the same direction of winding of the clutches, and that the adjuster would function satisfactory.

Figure 2:
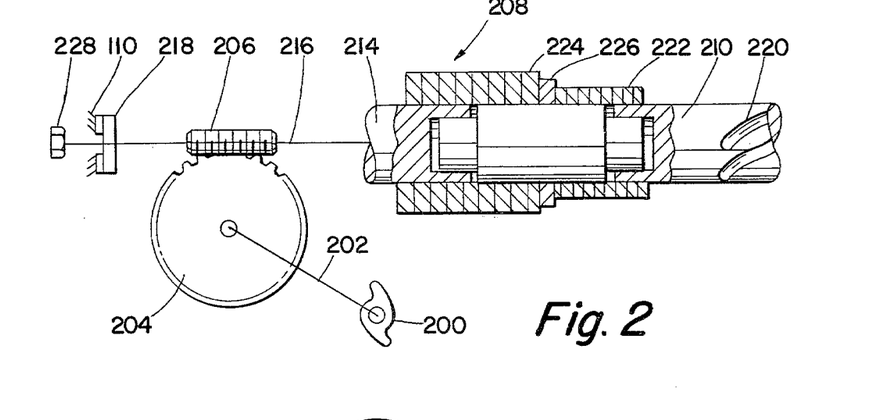
FIG. 2 is a schematic illustration of the slack adjuster of the present invention as utilized in connection with a cam actuated, expanding shoe drum brake.
Figure 2A:
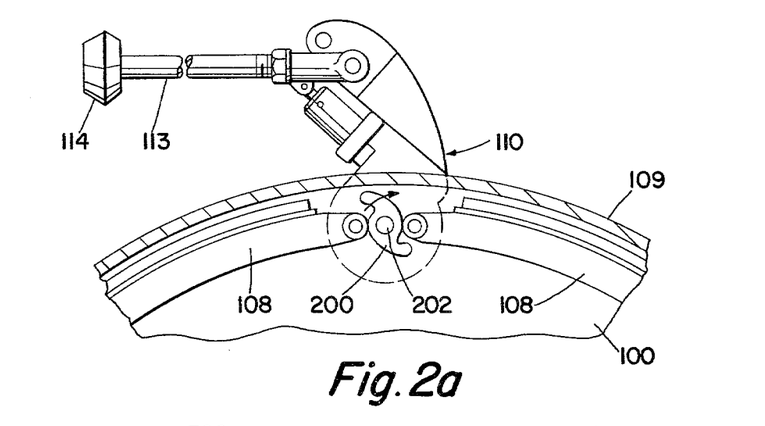
FIG. 2A is a partial view of a cam actuated drum brake utilizing the adjuster of FIG. 2.

An alternate embodiment of the present invention as utilized with a cam operated expanding shoe drum brake is schematically illustrated in FIGS. 2 and 2A. In FIG. 2A a drum brake assembly comprising a support 100, rotatably supporting a brake actuation cam 200 nonrotationally fixed to a cam shaft 202 for pivoting arcuate brake shoes 108 radially outwardly into frictional contact with a brake drum 109 is illustrated. A lever housing assembly 110 is adjustably rotationally fixed to cam shaft 202 and is pivotable under the action of rod 113 which is driven by an actuation motor such as fluid motor 114. As is known, the slack adjuster is housed in lever housing 110 and is effective to control the running clearance between shoes 108 and drum 109 by adjustment of the rotational position of operating cam relative to the lever housing 110.

Briefly, operating cam 200 is selectively rotatable to cause expansion of pivotable brake shoes 108 into frictional contact with the rotatable brake drum 109 to retard rotational motion of the brake drum. The rotational position of the cam 200 relative to the actuating lever housing 110 is utilize to adjust the running clearance between the shoes and drums to compensate for wear and the like. Drum brakes utilizing such adjusters are well known in the art and may be appreciated in greater detail by reference to the above mentioned U.S. Pat. No. 3,507,369.

The cam 200 is fixed to a cam shaft 202 which in turn is fixed to a worm gear 204 rotatably mounted in the lever. A worm 206 is rotatably mounted in the lever and engaged to the worm gear 204. Controlled rotation of the worm and resulting controlled rotation of the worm gear, the cam shaft and the cam relative to the lever is effective to adjust the running clearance or slack of the brake. The worm (and worm shaft) is thus a rotatable adjustment member. The automatic clearance sensing slack adjuster 208 includes a driving shaft 210, an intermediate shaft 212 and a driven shaft 214. Shafts 210, 212 and 214 are coaxial, rotatable relative to the lever 110 and to each other and define outer annular surfaces of substantially equal diameter. Shaft 214 is fixed or integral with worm shaft 216 of worm 206 and worm shaft 216 may be frictionally grounded, as at friction clutch 218 to the lever. Means are provided, such as helical splines 220, to impose a clockwise rotation to driving shaft 210 in response to the lever 110 being rotated beyond a predetermined angular departure from the at rest position thereof, such an angular departure being indicative of a greater than desired running clearance and/or of mechanical deflectives. The worm and worm gear are configured such that clockwise rotation of the worm 206 will advance the cam 200 in the slack decreasing or slack take-up direction of rotation.

The adjuster mechanism also includes a first coil clutch 222 wrapped around the adjacent ends of shafts 210 and 212 and a second coil clutch 224 wrapped around the adjacent ends of shafts 214 and 212. Coil clutch 222 is wound to transfer torque clockwise in the high torque transfer direction while coil clutch 224 is wound to transfer torque clockwise in the low torque transfer direction. A washer 226 may be interposed coil clutches 222 and 224.

A fitting, such as hex-shaped shaft end 228 accessible from the exterior of the housing, may be provided for manual back off of the slack adjuster. Friction grounding clutch 218, in combination with the other frictional resistances to rotation in the system, provides a torque resisting rotation of worm shaft 216 greater than the counterclockwise low torque capacity of coil clutch 222 to prevent undesirable back off during counterclockwise rotations of means 220. Clutch 218 will also resist rotative forces on the worm gear caused by forces applied to the cam 200 during brake operations.

The operation of the coil clutches 222 and 224 to provide automatic clearance sensing slack adjustment, to prevent undesired back-off and to allow manual back off and the advantages of the torque transfer characteristics of the clutch arrangements is substantially identical to that described for the structure discussed above in connection with the embodiment of FIG. 1 and will not be repeated.

Figure 3:
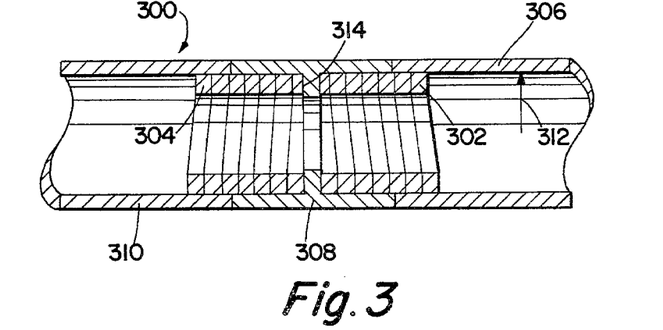
FIG. 3 is a partial schematic illustration of the present invention wherein the coil clutches engage the interior diameters of sleeves.

An alternate clutch and sleeve arrangement 300 is illustrated in FIG. 3. Briefly, the arrangement is similar to that illustrated in FIGS. 1 and 2 except that the coil clutches 302 and 304 operate on the interior diameters of drive sleeve 306, intermediate sleeve 308 and driven sleeve 310. In this arrangement, coil clutches 302 and 304 have an exterior diameter, in the relaxed position, somewhat greater than the interior diameters 312 of the sleeves 306, 308 and 310. The coil clutches 302 and 304 may be separated by a radially inwardly extending rib 314 formed in intermediate sleeve 308. It is noted that coil clutches of this type display the same torque transfer characteristics as those illustrated in FIGS. 1 and 2 and graphically represented in FIG. 3.

Although this invention has been described in its preferred embodiment with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. An automatic, single acting, clearance sensing slack adjuster for maintaining a predetermined running clearance between the selectively engageable friction surfaces of a brake comprising:
   a displaceable brake actuation means;
   a rotatable driving member;
   means for automatically rotating said driving member in response to greater than predetermined displacement of said brake actuation means;
   a rotatable intermediate member coaxial with and adjacent said driving member, said intermediate member rotatable relative to said driving member;
   a rotatable driven member coaxial with and adjacent said intermediate member, said driven member rotatable relative to said intermediate member;
   a rotatable adjustment member rotatably driven by said driven member, rotation of said adjustment member in a given direction of rotation effective to decrease slack in the brake and in the other direction or rotation to increase slack in the brake;
   a first coil clutch for rotationally coupling one of said driving member to said intermediate member and said intermediate member to said driven member, said first coil clutch wound to transfer torque in the high torque transfer capacity direction of rotation thereof when rotating said adjustment member in said given direction of rotation and to transfer torque in the low torque transfer capacity direction of rotation thereof when rotating in said other direction of rotation; and a second coil clutch for rotationally coupling the other of said driving member to said intermediate member and said intermediate member to said driven member, said second coil clutch wound to transfer torque in the low torque transfer capacity direction of rotation thereof when rotating said adjustment member in said given direction of rotation.

2. The adjuster of claim 1, wherein said first coil clutch rotationally couples said driving to said intermediate member and said second coil clutch rotationally couples said intermediate to said driven member.

3. The adjuster of claims 1 or 2, wherein said low torque transfer capacity of said second coil clutch is greater than the torque required to rotate said adjustment member when said brake friction surfaces are not in contact but is less than the torque required to rotate said adjustment member when said brake friction surfaces are in contact.

4. The adjuster of claim 3, wherein said adjustment mechanism is subject to a frictional resistance to rotation and the torque transfer capacity of said first coil clutch in the low torque transfer capacity direction of rotation thereof is less than the torque required to overcome said frictional resistance to rotation.

5. The adjuster of claim 4, wherein said slack adjuster includes a housing and said adjustment member includes a fitting for direct engagement by a tool from the exterior of the adjuster housing for manual rotation of said adjustment member.

6. The adjuster of claim 4, wherein said means for rotating said driving member will rotate said driving member in said given direction during the brake application operation and in said other direction during the brake release operation.

7. The adjuster of claim 6, wherein said adjuster includes a housing, said means for rotating and said driving member are relatively axially movable in said housing as a result of displacements of said brake actuation means, one of said means for rotation and said driving member is provided with generally helical splines in which are received pin members nonrotationally carried by the other of said means for rotating and said driving member, said pin members received in said splines with a backlash corresponding to the expected relative axial movement between said means for rotating and said driving member when the running clearance between the brake friction surfaces is within predetermined acceptable limits.

8. The adjuster of claim 4, wherein said driving and intermediate members define adjacent annular first exterior surfaces of a substantially equal first outer diameter, said first coil clutch wrappingly received on said first surfaces, the interior diameter of said first coil clutch in the relaxed position thereof being slightly less than the first outer diameter and wherein said intermediate and driven members define adjacent annular second exterior surfaces of a substantially equal second outer diameter, said second coil clutch wrappingly received on said second surfaces, the interior diameter of said second coil clutch in the relaxed position thereof being slightly less than the second outer diameter.

9. The adjuster of claim 8, wherein said first and second outer diameter are substantially equal.

10. The adjuster of claim 9, wherein a spacer is interposed said first and second coil clutches.

11. The adjuster of claim 7, wherein said driving and intermediate members define adjacent annular first interior bores of a substantially equal first inner diameter, said first coil clutch compressably received in said first bores, the outer diameter of said first coil clutch in the relaxed position thereof slightly greater than the first inner diameter and wherein said intermediate and driven members define adjacent annular second interior bores of a substantially equal second inner diameter, said second coil clutch compressably received in said second bores, the outer diameter of said second coil clutch in the relaxed position thereof slightly greater than the second inner diameter.

12. A disc brake actuation assembly including an automatic single-acting clearance sensing slack adjuster for maintaining a predetermined running clearance between the brake friction pads and the disc, said assembly including:

a support;

a disc rotatable relative to said support;

an actuator housing nonrotationally fixed to said support;

at least one friction pad axially movable relative to said support for selective engagement with said disc to retard rotational movement of said disc relative to said support;

a plunger assembly axially movable in said housing, means to axially move said friction pad mounted to one end of said plunger assembly, said plunger assembly comprising a nut member and a rod member, said rod member having a first rod end threadably engaged to said nut member and a second rod end carrying said means to axially move said friction pad, one of said nut and rod members being rotationally fixed to said housing whereby rotation of the other of the nut and rod member in a given direction of rotation will result in axial movement of said means to axially move said pad relative to said nut member towards said disc and rotation in the other direction will result in axial movement of said means to axially move said pad relative to said nut away from said disc;

a wedge actuator assembly mounted to said housing, said wedge actuator assembly comprising a push rod adapted for attachment to an actuator motor and a roller cage assembly mounted to said push rod, said roller cage assembly engaging the other end of said plunger assembly and effective upon extension from said motor to force said plunger assembly towards said disc;

a return spring biasing said plunger assembly toward said roller cage assembly;

a driving member rotatable in said housing;

means for rotating said driving member in response to greater than predetermined axial displacement of said plunger assembly;

an intermediate member rotatable in said housing, said intermediate member coaxial with and adjacent said driving member, said intermediate member rotatable relative to said driving member;

a driven member rotatable in said housing, said driven member coaxial with and adjacent said intermediate member, said driven member rotatable relative to said intermediate member, said driven member rotatably drivingly connected to the rotatable one of said rod and nut member;

a first coil clutch for rotationally coupling one of said driving member to said intermediate member and said intermediate member to said driven member, said first coil clutch wound to transfer torque in the high torque transfer capacity direction of rotation thereof in said given direction of rotation and to transfer torque in the low torque transfer capacity direction of rotation thereof when rotating in said other direction of rotation; and a second coil clutch for rotationally coupling the other of said driving member to said intermediate member and said intermediate member to said driven member, said second coil clutch wound to transfer torque in the low torque transfer capacity direction of rotation thereof in said given direction of rotation.

13. The adjuster of claim 12, wherein said first coil clutch rotationally couples said driving and said intermediate member and said second coil clutch rotational couples said intermediate and said driven member.

14. The disc brake actuator assembly of claims 12 or 13, wherein said low torque transfer capacity of said second coil clutch is greater than the torque required to rotate said rotatable one of said nut and rod members when said brake friction pad and disc are not in contact but is less than the torque required to rotate said rotatable one of said nut and rod members when said brake friction pad and disc are in contact.

15. The disc brake actuator assembly of claim 14, wherein said rotatable one of said rod and nut member is subject to a frictional resistance to rotation and the torque transfer capacity of said first coil clutch in the low torque transfer capacity direction of rotation thereof is less than the torque required to overcome said frictional resistance to rotation.

16. The disc brake actuator assembly of claim 15, wherein said rod member is rotationially fixed to said housing, said driving and intermediate members are sleeves rotationally supported on said nut member and axially movable therewith, said driven member is a sleeve surrounding and splined to said nut member and axially movable therewith and said means to rotate said driving member comprises at least one radially inwardly extending pin mounted to said housing and received in a substantially helical spline in said driving member, said pin received in said helical spline with an axial backlash corresponding to expected axial movement of said plunger assembly when said running clearance is within predetermined limits.

17. The disc brake actuator assembly of claim 6, wherein said driving and intermediate members define adjacent annular first exterior surfaces of a substantially equal first outer diameter, said first coil clutch wrappingly received on said first surfaces, the interior diameter of said first coil clutch in the relaxed position thereof being slightly less than the first outer diameter and wherein said intermediate and driven members define adjacent annular second exterior surfaces of a substantially equal second outer diameter, said second coil clutch wrappingly received on said second surfaces, the interior diameter of said second coil clutch in the relaxed position thereof being slightly less than the second outer diameter.

18. The disc brake actuator assembly of claim 17, wherein said first and second outer diameters are substantially equal and a spacer is interposed between said first and second coil clutches.

19. The disc brake actuator assembly of claim 17, wherein said nut member is provided with a fitting for receipt of a tool and said housing is provided with a bore aligned with said fitting for access thereto from the exterior of said housing.

20. An automatic single acting slack adjuster for a cam actuated expanding shoe drum brake for maintaining a predetermined running clearance between the brake shoe friction pads and the drum, said adjuster comprising:

an actuating lever housing adjustably rotationally fixed to said cam, rotation of said lever housing about an axis effective to operate said brake, said lever housing connectable to a brake operating means;

a worm gear rotationally received in said lever housing, said worm gear rotationally fixed to said cam;

a worm rotatably received in said lever housing, said worm engaged with said worm gear whereby rotation of said worm in a given direction relative to said lever housing is effective to vary the rotational orientation of said cam relative to said lever housing to reduce the slack in the brake;

a driving member rotatably received in said lever housing;

means for rotating said driving member in response to greater than predetermined angular displacement of said lever housing;

an intermediate member coaxial with and adjacent said driving member rotatably received in said lever housing, said intermediate member rotatable relative to said driving member;

a worm shaft nonrotationally carrying said worm coaxial with and adjacent said intermediate member rotatably received in said lever housing, said worm shaft rotatable relative to said intermediate member;

a first coil clutch for rotationally coupling one of said driving member to said intermediate member and said intermediate member to said worm shaft, said first coil clutch wound to transfer torque in the high torque transfer capacity direction of rotation when rotating said adjustment member in said given direction of rotation and to transfer torque in the low torque transfer capacity direction of rotation thereof when rotating in said other direction of rotation; and a second coil clutch for rotationally coupling the other of said driving member to said intermediate member and said intermediate member to said worm shaft, said second coil clutch wound to transfer torque in the low torque transfer capacity direction of rotation when rotating said adjustment member in said given direction of rotation.

21. The adjuster of claim 20, wherein said first coil clutch rotationally couples said driving to said intermediate member and said second coil clutch rotational couples said intermediate member to said worm shaft.

22. The adjuster of claims 20 or 21, wherein said low torque transfer capacity of said second coil clutch is greater than the torque required to rotate said worm when said brake friction pads are not in contact but is less than the torque required to rotate said worm when said brake friction pads are in contact.

23. The adjuster of claim 22, wherein said worm is subject to a frictional resistance to rotation and the torque transfer capacity of said first coil clutch in the low torque transfer capacity direction of rotation thereof is less than the torque required to overcome said frictional resistance to rotation.

24. The adjuster of claim 23, wherein said worm shaft is frictionally grounded to said lever.

25. The adjuster of claim 23, wherein said means for rotating said driving member will rotate said driving member in the direction for rotating said worm in said given direction during the brake application operation and in the opposite direction during the brake release operation.

26. The adjuster of claim 23, wherein said driving and intermediate members define adjacent annular first exterior surfaces of a substantially equal first outer diameter, said first coil clutch wrappingly received on said first surfaces, the interior diameter of said first coil clutch in the relaxed position thereof being slightly less than the first outer diameter and wherein said intermediate member and worm shaft define adjacent annular second exterior surfaces of a substantially equal second outer diameter, said second coil clutch wrappingly received on said second surfaces, the interior diameter of said second coil clutch in the relaxed position thereof being slightly less than the second outer diamter.

27. An automatic, single acting, clearance sensing slack adjuster for maintaining a predetermined running clearance between the selectively engageable friction surfaces of a brake comprising:
a displaceable brake actuation means;
a rotatable driving member;
means for automatically rotating said driving member in response to greater than predetermined displacement of said brake actuation means;
a rotatable intermediate member coaxial with and adjacent said driving member, said intermediate member rotatable relative to said driving member;
a rotatable driven member coaxial with and adjacent said intermediate member, said driven member rotatable relative to said intermediate member, rotation of said driven member in a given direction of rotation effective to decrease slack in the brake and in the other direction of rotation to increase slack in the brake;
a rotational coupling having a high torque transfer capacity and a low torque transfer capacity direction of rotation for rotationally coupling one of said driving member to said intermediate member and said intermediate member to said driven member, said rotational coupling adapted to transfer torque in the high torque transfer capacity direction of rotation thereof when rotating said driven member in said given direction of rotation; and
a torque limiting coil clutch for rotationally coupling the other of said driving member to said intermediate member and said intermediate member to said driven member, said coil clutch wound to transfer torque in the low torque transfer capacity direction of rotation thereof when rotating said driven member in said given direction of rotation.

28. The adjuster of claim 27, wherein said rotational coupling rotationally couples said driving member to said intermediate member and said coil clutch rotationally couples said intermediate member to said driven member.

29. The adjuster of claims 27 or 28, wherein said low torque transfer capacity of said coil clutch is greater than the torque required to rotate said driven member when said brake friction surfaces are not in contact but is less than the torque required to rotate said driven member when said brake friction surfaces are in contact.

30. An automatic, single acting, clearance sensing slack adjuster for maintaining a predetermined running clearance between the selectively engageable friction surfaces of a brake comprising:
a displaceable brake actuation means;
a rotatable driving member;
means for automatically rotating said driving member in response to predetermined displacement of said brake actuation means;
a rotatable intermediate member coaxial with and adjacent said driving member, said intermediate member rotatable relative to said driving member;
a rotatable driven member coaxial with and adjacent said intermediate member, said driven member rotatable relative to said intermediate member;
a rotatable adjustment member rotatably driven by said driven member, rotation of said adjustment member in a given direction of rotation effective to decrease slack in the brake and in the other direction to increase slack in the brake;
a rotatable coupling having a high torque transfer capacity and low torque transfer capacity direction of rotation for rotationally coupling one of said driving member to said intermediate member and said intermediate member to said driven member, said rotatable coupling adapted to transfer torque in the high torque transfer capacity direction of rotation thereof when rotating said adjustment member in said given direction of rotation;
a torque limiting coil clutch for rotationally coupling the other of said driving member to said intermediate member and said intermediate member to said driven member, said coil clutch wound to transfer torque in the low torque transfer capacity direction of rotation thereof when rotating said adjustment member in said given direction of rotation, said low torque transfer capacity of said coil clutch being greater than the torque required to rotate said adjustment member when said brake friction surfaces are not in contact but is less than the torque required to rotate said adjustment member when said brake friction surfaces are in contact; and
means for providing a predetermined lost motion between said means for rotating said driving member and said adjustment member, said predetermined lost motion allowing a predetermined displacement of said brake actuation means without rotation of said adjustment member in said given direction of rotation.

31. The adjuster of claim 30, wherein said rotational coupling rotationally couples said driving to said intermediate member and said coil clutch rotationally couples said intermediate to said driven member.

* * * * *